United States Patent Office 3,695,941
Patented Oct. 3, 1972

3,695,941
PREPARATION OF EUTECTIC MATERIAL
Geoffrey William Green, 5 Piers Close, and Donald Thomas James Hurle, Grithacre, Marlbank Road, both of Malvern, England
Continuation-in-part of application Ser. No. 668,587, Sept. 18, 1967. This application May 4, 1970, Ser. No. 34,102
Claims priority, application Great Britain, Sept. 20, 1966, 41,836/66, Patent 1,192,736
Int. Cl. B01j 17/06
U.S. Cl. 148—1.6    8 Claims

ABSTRACT OF THE DISCLOSURE

A method of preparing solid eutectic material by controlled solidification from the melt includes the application of a steady directional magnetic field to the liquid-solid interface in order to reduce banding perpendicular to the direction of growth. The method is applied when no external source of electric current is electrically connected to the material, and the solidification process may include pulling from the melt, zone melting or normal freezing.

---

This application is a continuation-in-part of application Ser. No. 668,587, filed Sept. 18, 1967, now abandoned.

The present invention relates to the preparation of eutectic material.

In a two-component system in which the components may be either pure elements or compounds a eutectic mixture will typically solidify at a eutectic temperature to form a solid which consists of an intimate mixture of crystals of the phases of the two components. The particular morphology adopted by this mixture of the two phases depends upon a number of factors which include the nature of the components, the composition of the eutectic mixture and the conditions of crystallisation.

If the components are both metal-like and the eutectic is in the region of equal proportions between the components then the phases are commonly present in the form of lamellae whose thickness varies with the rate of crystallisation but is typically of the order of microns. If, however, the eutectic differs greatly from equal proportions between the constituents then the material frequently crystallises in the form of rods of the minor phase embedded in a matrix of the major phase. The rods are aligned in or nearly in the direction of growth.

Several applications of eutectic structures have been reported. For example, it has been shown that aligned two-phase eutectic structures can take the form of whisker-reinforced composite materials. Also a eutectic composition of NiSb-InSB (about 1.8% NiSb) containing rods of NiSb has been shown to have a high magneto resistance. This means that if the rods are oriented perpendicularly to both current and magnetic field in the magnetoresistive element of a magnetoresistive device they serve to short out the Hall voltage and a marked enhancement of magnetoresistance occurs. Also, directionally grown eutectics have been shown separately to possess thermoelectric, magnetic and superconductive properties. With such interesting device possibilities it is usually necessary to grow the eutectics required in the most perfect form possible.

During the study of molten substanes we discovered that molten gallium contained in a vessel with at each end a thermode (i.e. a contact to produce a temperature gradient through the molten gallium) showed interesting properties. Thermocouple contacts were dipped lightly into the surface and it was found that the temperature at any point showed oscillations with time. It was found that the oscillation amplitudes varied from about 0.5 to 2.0° C. when the temperature gradient through the gallium exceeded a critical value in the order of 5° C. per cm. The oscillations were either pure sine waves (at lower temperature gradients) or sine waves modulated with other sine waves of different frequency (at higher temperature gradients). It was concluded that molten substances subjected to over-critical temperature gradients would show these oscillations. Later work has supported this view.

It was later realised that one of the reasons for the unwanted property of "banding" in eutectics grown in a form which would otherwise serve in one of the devices mentioned above was the temperature fluctuations which we had discovered in molten materials.

It was found that if, during growth from the melt of a directionally solidified eutectic structure, a steady directional magnetic field was applied across the melt in the region near the interface with solidified material then a damping of the temperature oscillations in the melt occurred and consequently eutectics solidified therefrom did not possess banding.

It is an object of the present invention to reduce temperature fluctuations in stationary molten eutectic compositions.

It is also an object of the invention to reduce banding in directionally solidified eutectics.

According to the present invention a method of preparing eutectic material from the melt includes the step of placing the liquid in an externally generated, steady, directional magnetic field and in which no external source of electric current is electrically connected to the material.

The controlled solidification from the melt may be carried out by any of the known methods, and may thus include crystal pulling from the melt, zone melting and "normal freezing" (freezing of a piece of material initially in the liquid state, whereby the liquid solid-interface moves along the piece in a direction normal to the interface).

Embodiments of the invention will be described by way of example with reference to the accompanying drawings in which.

Figure 1:
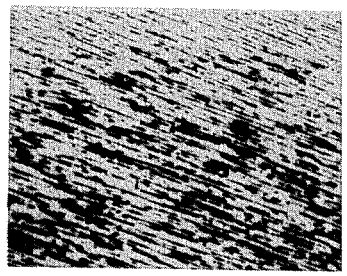
FIGS. 1 and 2 are photographs of longitudinal and transverse sections respectively through a piece of InSb-NiSb eutectic.
Figure 2:
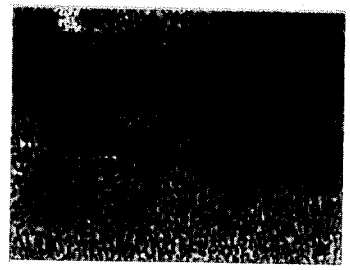

FIGS. 1 and 2 are photographs of longitudinal and transverse sections respectively through a piece of InSb-NiSb eutectic. The eutectic composition is 1.8 weight percent NiSb. Because NiSb is much the minor constituent it forms in a set of rods embedded in the matrix of the InS. The rods are formed in a direction which is the growth direction of the eutectic, which is diagonally from the top left hand corner of the photograph to the bottom right-hand corner in FIG. 1. The density of rods intersecting the plane normal to the growth axis has been shown to be proportional to the growth rate. This density is represented by the density of the dots (i.e. rod ends) in FIG. 2.

Figure 3:
FIG. 3 is a photograph of a longitudinal section through a piece of InSb-NiSb eutectic which exhibits "banding."

FIG. 3 is a photograph of a longitudinal section through a piece of InSb-NiSb eutectic which exhibits "banding." The "bands" in this case are seen in the photograph to be three in number and are the clear vertically running regions in the left, centre and right parts of the photographs. (The centre one is not so pronounced as those in the left and right parts of the photograph.) The bands consist of regions of single phase InSb. It is apparent that if uniform eutectic structures of the form of FIGS. 1 and 2 are required, then steps need to be taken to alleviate the problem of banding.

The banding is caused by fluctuations of the type described above in the temperature of the melt. The temperature fluctuations are due to convective oscillations within the liquid. At the liquid-solid interface the temperature oscillates with time and this means that the condition for freezing at the interface varies between that favouring formation of a solid eutectic solution and that favouring the formation of a single phase solid. The amplitudes of oscillation are in a direction perpendicular to that of the main temperature gradient and since the main temperature gradient direction is usually the direction of growth the bands also form in a direction perpendicular to the direction of growth. Thus, it is necessary in optimum growth conditions to grow in a direction parallel to the main temperature gradient, in order that the direction in which banding would occur may be identified and also to grow with a planar liquid-solid interface so that the plane of the temperature oscillation amplitude is the same thereas (so that the temperature oscillations may be most easily identified and reduced).

Banding shows a greater tendency to form as the percentage of the minor phase in the eutectic decreases (as illustrated in the case of InSb-NiSb above). The tendency also increases with increased temperature gradients during growth. The obvious solution is to have very small, i.e. below critical, temperature gradients. This, however, is of little practical use in the case of many systems such as the NiSb-InSb system. It is often desired to make this system of n-type conductivity by adding a little zinc. The effect is that low temperature gradients applied to this three component system produce constitutional supercooling. It is pointed out that the major phase of the directionally solidified eutectics to which the invention is applied would normally be a continuous single crystal but for the presence of the rods of the minor phase.

A steady directional magnetic field applied across the molten material in the region of the liquid-solid interface reduces the problem of banding in the solid. The field damps the oscillatory convection. This is believed to be done by inducing small E.M.F.'s in the liquid because of the oscillatory motion and making the liquid to work against the E.M.F.'s (and their subsequent eddy-currents) which means that a slowing down of the convective motions occurs. (This action is similar to that of a magnetic brake often used in domestic electricity meters.) It is apparent that the material to which the magnetic field is applied must have a sufficient number of free charge carriers for them to be affected thereby (i.e. the material needs to be somewhere in the conductivity range having as its limits conductors and semi-insulators).

The examples of eutectic growth described with reference to FIGS. 4, 5 and 6 respectively below all have conditions suitable for growing eutectics usable in such devices as those described above. These are a unidirectional, slow growth, a planar liquid-solid interface (perpendicular to the growth direction, a liquid stabilised as much as, possible) (rocking or swaying of the liquid would add to the convective motions of the liquid and increase the tendency of forming banding) controlled growth, i.e. at a certain rate in a certain direction, and a steady directional magnetic field applied (in the absence of an external source of electric current being applied) to the material to reduce banding in the solid.

Eutectic solids grown in this manner are not only free from the problem of banding but also exhibit all the properties of materials grown by such controlled processes as zone melting, normal freezing and pulling from the melt. These include a general removal of most of the solid state defects such as dislocations, stacking faults (planar defects), impurities (provided the starting materials are pure) and gas bubbles and cracks (macroscopic defects).

Figure 4:
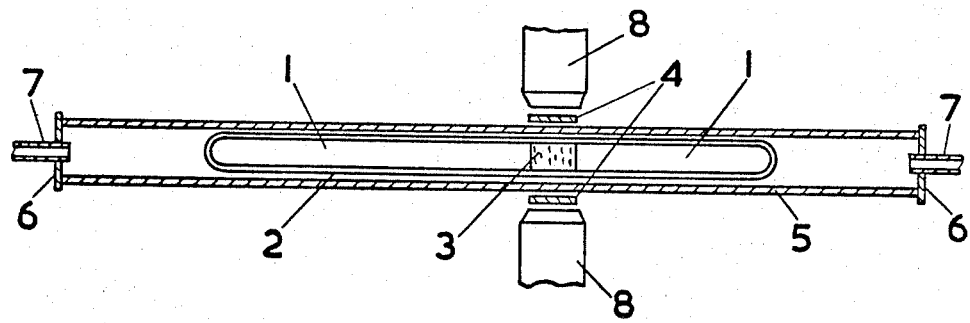
FIG. 4 is a schematic representation, in plan, of a horizontal melting apparatus.

FIG. 4 is a schematic representation of a horizontal zone melting apparatus.

A charge of material 1 is contained in a suitable boat 2. A molten zone 3 is established in the charge by a heater 4 supplied with a suitable controlled source of power (not shown). The boat and charge are contained within an envelope 5 fitted with end pieces 6 which permit evacuation of the envelope or the admission of inert gas via tubes 7. The magnetic field is applied from either permanent magnets or electromagnets (not shown) via pole pieces 8.

The zone is caused to move slowly along the charge by some mechanical means (not shown) either by moving the boat and charge or by moving the heater and magnet together so as to maintain the magnetic field across the molten zone.

Figure 5:
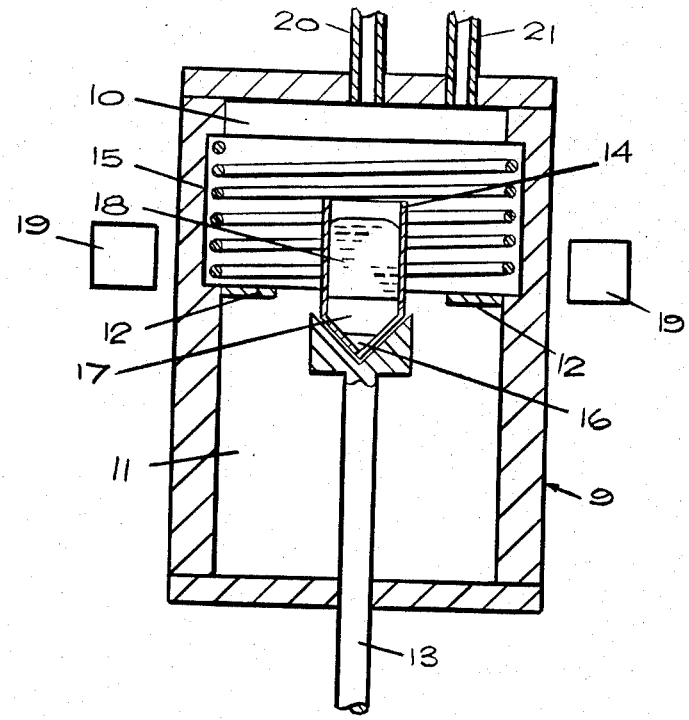
FIG. 5 is a schematic representation, in elevation, of an apparatus for performing "normal freezing."

FIG. 5 is a cross-sectional diagram of an apparatus for solid eutectiv growth. It illustrates the invention as applied to the well-known Bridgman method of solidification (an example of normal freezing). A furnace 9 contains two regions 10 and 11 which are separated by heat baffles 12. A holder 13 contains on its head a V-groove supporting a crucible 14 containing the charge. The holder 13 is lowered very slowly at a rate in the order of 1 cm. per hour (the rate is determined by the particular eutectic) so that the crucible passes also very slowly from the furnace region 10 to the furnace region 11. A heating coil 15 is located at the wall of the region 10. This produces a temperature gradient in the order of 10° C. per cm. (the gradient is determined separately for each particular eutectic) with temperature decreasing towards the lower part of the region 11. Contained at the tip of the crucible 14 is a seed 16 of solidified material. As the crucible is lowered a solidified region 17 is formed from a molten region 18 of the charge. A magnetic field, either from an electromagnetic or permanent magnets, is applied by means of pole pieces 19.

The pole pieces 19 are located so that the magnetic field, which is steady and directional (non-alternating with time and essentially in one direction) appears across the molten region 18 of the charge just above the interface between the molten region 18 and the solidified region 17. In this structure the pole piece 19 are fixed but they may be initially movable to locate their optimum vertical position.

The furnace 9 may be pumped to a vacuum by removing air through a tube 20 and an inert gas may be passed in through a tube 21. (The tubes 20, 21 are then stoppered).

Figure 6:
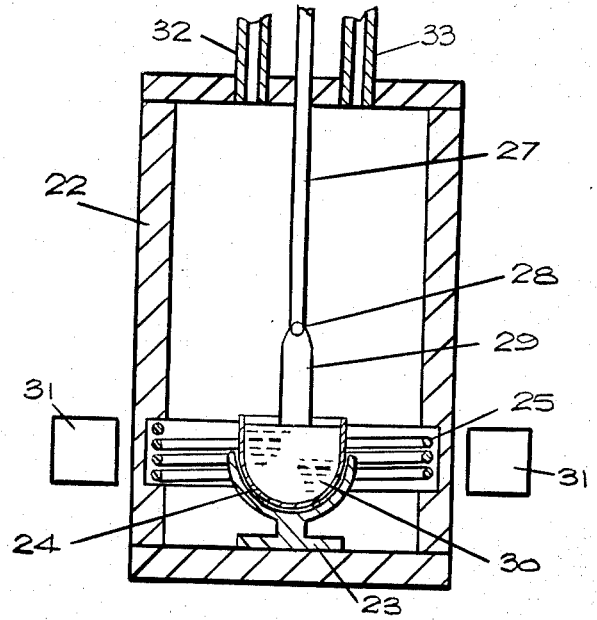
FIG. 6 is a schematic representation, in elevation, of an apparatus for pulling from the melt.

FIG. 6 is a cross-sectional diagram of a eutectic solidifying apparatus. It illustrates the invention as applied to the well know Czochralski method of solidification (an example of pulling from the melt). A furnace 22 contains a holder 23 at its base which holds a crucible 24 containing a charge. A heating coil 25 surrounds the crucible 24. A rod 27 with a solidified seed 28 at its tip is dipped into the charge when molten and pulled slowly therefrom at a rate in the order of 1 cm. per hour (the rate is determined by the particular eutectic), pulling a solidified region 29 from a molten region 30 of the charge. As in the Bridgman technique, pole pieces 31 are located so that a steady directional magnetic field is directed towards the molten region 24 in the part thereof immediately below the interface with the solidified region 29. Since the interface, as in the Bridgman method described above, is essentially stationary the pole pieces 31 are fixed although they may be initially moved to locate the best vertical position. The rod 27 may be slowly rotated about its axis at a rate in the order of 10 revolutions per minute in order to help smooth out temperature fluctuations at the interface between the molten region 30 and the solidified region 30.

The apparatus may be pumped to a vacuum via a tube 32 and inert gas may be added through the tube 33 after which the tubes 32 and 33 are stoppered.

The magnetic field strength required in each of the three methods must be found by experiment but it is unlikely to exceed a few kilogauss. (Suitable fields for the NiSb-InSb system have been found to be 2 kilogauss. Whilst the orientation of the magnetic field shown in the drawings is satisfactory for these methods of growth, the optimum orientation of the field for any particular technique must be determined by consideration of the particular technique used. This means that by considering or by finding by experiment the direction in which the oscillations occur in the melt, then the optimum orientation of the magnetic field may be determined, and is usually in a direction perpendicular to the amplitudes of the oscillations.

Besides application to NiSb-InSb systems which show in consequence a higher magnetoresistance, the invention may also be applied to high tensile strength eutectic materials such as tantalum/ditantalum monocarbide ($Ta_2C$) and niobium/diniobium monocarbide ($Nb_2C$), in which strengthening is due to "whisker" reinforcement.

We claim:
1. A method of preparing solid eutectic material by controlled freezing from the liquid state at a substantially planar interface under which motion in the liquid material is stabilized and in which said material is significantly affected by a magnetic field, and including the step of placing the region of said liquid material adjacent said interface in an externally generated steady directional magnetic field and in which no external source of electric current is electrically connected to said material.

2. A method as in claim 1 and in which said magnetic field has a component transverse to the growth direction of said solid eutectic material.
3. A method as in claim 1 and in which said material is prepared by pulling from the melt.
4. A method as in claim 2 and in which said material is prepared by pulling from the melt.
5. A method as in claim 1 and in which said material is prepared by zone melting.
6. A method as in claim 2 and in which said material is prepared by zone melting.
7. A method as in claim 1 and in which said material is prepared by normal freezing.
8. A method as in claim 2 and in which said material is prepared by normal freezing.

References Cited
UNITED STATES PATENTS

| | | | |
|---|---|---|---|
| 1,978,222 | 10/1934 | Otte | 148—108 |
| 3,124,452 | 3/1964 | Kraft | 75—135 |
| 3,341,358 | 9/1967 | Clawson et al. | 148—1.6 X |
| 3,378,409 | 4/1968 | Hurle et al. | 148—1.6 |
| 3,410,665 | 11/1968 | Müller et al. | 148—1.6 X |

L. DEWAYNE RUTLEDGE, Primary Examiner

E. L. WEISE, Assistant Examiner

U.S. Cl. X.R.

75—135

UNITED STATES PATENT OFFICE
CERTIFICATE OF CORRECTION

Patent No. 3,695,941　　　　　　　Dated October 3, 1972

Inventor(s) Geoffrey William Green and Donald Thomas James Hurle

It is certified that error appears in the above-identified patent and that said Letters Patent are hereby corrected as shown below:

In the heading, after "Malvern, England" add --assignors to National Research Development Corporation, London, England--

Signed and sealed this 15th day of May 1973.

(SEAL)
Attest:

EDWARD M. FLETCHER, JR.
Attesting Officer

ROBERT GOTTSCHALK
Commissioner of Patents